United States Patent
Ofuji et al.

(10) Patent No.: US 7,668,150 B2
(45) Date of Patent: Feb. 23, 2010

(54) PACKET-PRIORITY CONTROL APPARATUS AND METHOD THEREOF

(75) Inventors: Yoshiaki Ofuji, Yokosuka (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 396 days.

(21) Appl. No.: 10/931,990

(22) Filed: Sep. 2, 2004

(65) Prior Publication Data
US 2005/0063392 A1     Mar. 24, 2005

(30) Foreign Application Priority Data
Sep. 4, 2003     (JP)     ............................. 2003-312320

(51) Int. Cl.
    *H04J 3/24*     (2006.01)
(52) U.S. Cl. ................ 370/349; 370/401; 370/411; 370/328; 370/200; 370/311; 370/230.1; 370/95.21; 370/338; 370/394; 370/252; 370/425; 370/441; 370/444; 370/389; 370/412; 455/560
(58) Field of Classification Search ........... 370/412, 370/425, 441, 444, 428, 389, 419, 311, 200, 370/229, 328, 411, 401, 394, 338, 352, 395.21, 370/230.1, 95.21, 447; 455/560
See application file for complete search history.

(56) References Cited

U.S. PATENT DOCUMENTS

| | | | | |
|---|---|---|---|---|
| 5,832,304 | A * | 11/1998 | Bauman et al. | 710/40 |
| 6,081,513 | A * | 6/2000 | Roy | 370/260 |
| 6,324,169 | B1 * | 11/2001 | Roy | 370/260 |
| 6,466,608 | B1 * | 10/2002 | Hong et al. | 375/137 |
| 6,538,989 | B1 * | 3/2003 | Carter et al. | 370/229 |
| 6,697,352 | B1 * | 2/2004 | Ludwig et al. | 370/349 |
| 6,728,208 | B1 * | 4/2004 | Puuskari | 370/230.1 |
| 6,760,328 | B1 * | 7/2004 | Ofek | 370/389 |
| 6,912,225 | B1 * | 6/2005 | Kohzuki et al. | 370/412 |
| 7,114,002 | B1 | 9/2006 | Okumura et al. | |
| 7,117,003 | B2 * | 10/2006 | Kayama et al. | 455/522 |

(Continued)

FOREIGN PATENT DOCUMENTS

EP     1 054 544 A2     11/2000

(Continued)

OTHER PUBLICATIONS

Paul Bender, et al., "CDMA/HDR: A Bandwidth-Efficient High-Speed Wireless Data Service for Nomadic Users", IEEE Communications Magazine, Jul. 2000, pp. 70-77.

(Continued)

*Primary Examiner*—Rafael Pérez-Gutiérrez
*Assistant Examiner*—Joseph Arevalo
(74) *Attorney, Agent, or Firm*—Oblon, Spivak, McClelland, Maier & Neustadt, L.L.P.

(57) ABSTRACT

An apparatus for packet-priority control for controlling a priority for packets input includes packet-priority setting means for setting hierarchically the priority for the packet input based on predetermined elements, and to adjust, taking into account other elements according to which the priority for the packet varies over time, the set priority, and wireless-resource allocating means for determining a packet for which a wireless resource is to be allocated in accordance with the adjusted priority.

14 Claims, 15 Drawing Sheets

U.S. PATENT DOCUMENTS

| | | | |
|---|---|---|---|
| 7,145,869 B1* | 12/2006 | Kadambi et al. | 370/229 |
| 2002/0126675 A1* | 9/2002 | Yoshimura et al. | 370/395.21 |
| 2002/0163879 A1* | 11/2002 | Li et al. | 370/200 |
| 2003/0039213 A1* | 2/2003 | Holtzman et al. | 370/252 |
| 2003/0057887 A1* | 3/2003 | Dowling et al. | 315/291 |
| 2003/0072261 A1* | 4/2003 | Shinagawa | 370/229 |
| 2003/0095551 A1* | 5/2003 | Gotoh et al. | 370/395.3 |
| 2003/0096631 A1* | 5/2003 | Kayama et al. | 455/522 |
| 2003/0133411 A1* | 7/2003 | Ise et al. | 370/230 |
| 2004/0081134 A1* | 4/2004 | Kotzin | 370/348 |
| 2004/0120306 A1* | 6/2004 | Wigard et al. | 370/349 |
| 2005/0063392 A1* | 3/2005 | Ofuji et al. | 370/395.42 |
| 2005/0208960 A1* | 9/2005 | Hassan | 455/522 |
| 2006/0062144 A1* | 3/2006 | Testa et al. | 370/229 |
| 2007/0081498 A1* | 4/2007 | Niwano | 370/335 |

FOREIGN PATENT DOCUMENTS

| | | |
|---|---|---|
| EP | 1 054 544 A3 | 11/2000 |
| EP | 1 335 621 A1 | 8/2003 |
| JP | 61-140253 | 6/1986 |
| JP | 9-51344 | 2/1997 |
| JP | 10-200494 | 7/1998 |
| JP | 2002-118585 | 4/2002 |
| JP | 2002-185457 | 6/2002 |
| WO | WO 02/30067 A1 | 4/2002 |

OTHER PUBLICATIONS

Toyokl UE, et al., "Symbol Rate and Modulation Level-Controlled Adaptive Modulation/TDMA/TDD System for High-Bit-Rate Wireless Data Transmission", IEEE Transactions on Vehicular Technology, vol. 47, No. 4, Nov. 1998, pp. 1134-1147.

A. Jalali, et al., "Data Throughput of CDMA-HDR a High Efficiency-High Data Rate Personal Communication Wireless System", IEEE 51st Vehicular Technology Conference, May 2000, pp. 1854-1858.

Masahiro Ono, et al., "A Proposal of AII-IP Mobile Wireless Network Architecture (3), QoS Packet Scheduler for Base Stations", Technical Report of IEICE, MoMuC2002-3, May 2002, pp. 13-18.

* cited by examiner

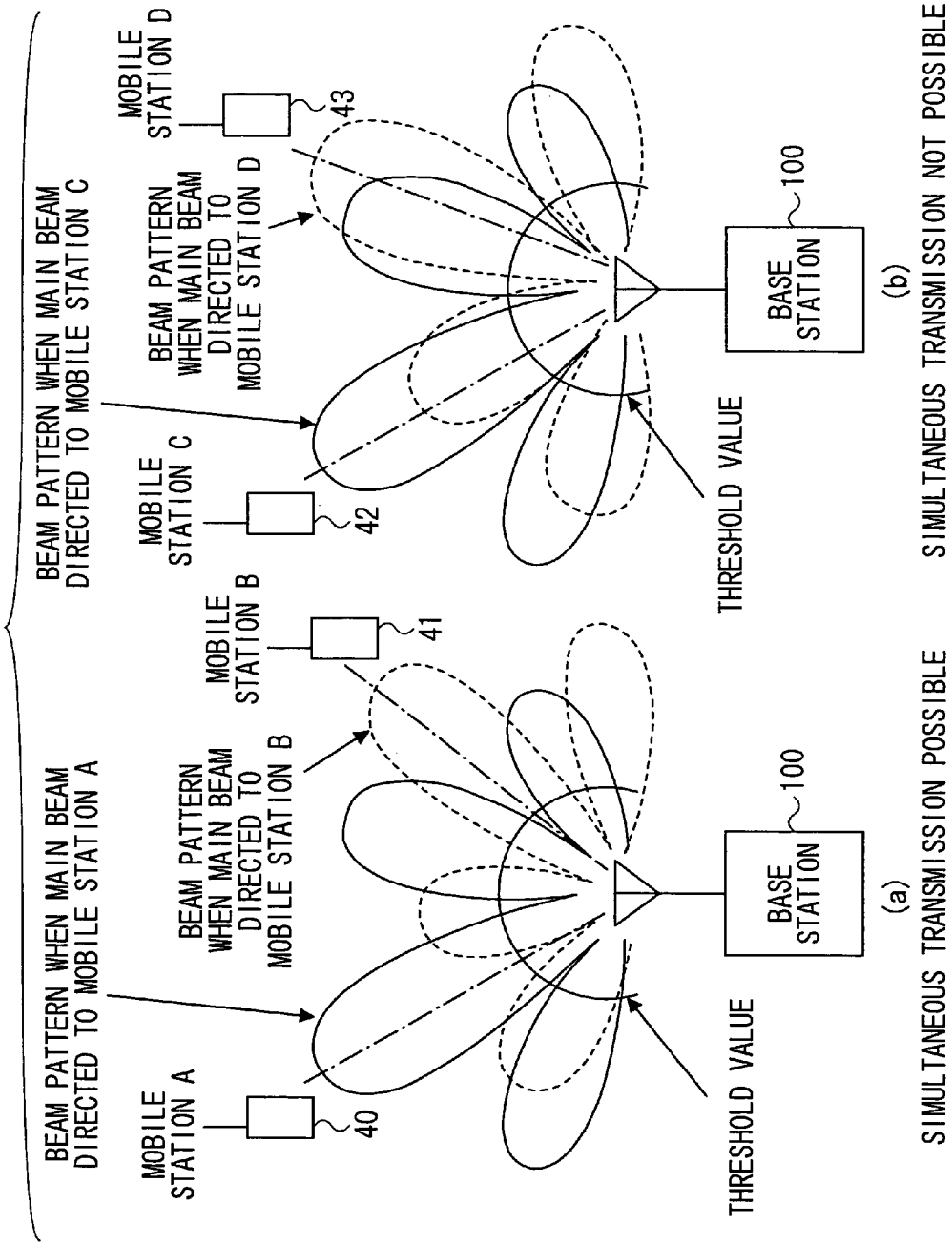

PACKET-PRIORITY CONTROL APPARATUS AND METHOD THEREOF

BACKGROUND OF THE INVENTION

1. Field of the Invention

The present invention generally relates to a wireless packet communication apparatus and method, and particularly relates to a packet priority control apparatus and a method thereof in a wireless communications system.

2. Description of the Related Art

The W-CDMA method, one of the wireless interfaces of the IMT-2000, enables multimedia access of not only voice but also video images, electronic mail, and the Internet, etc., at a maximum rate of 2 Mbps stationary (at a maximum rate of 384 kbps for moving outdoors at high speed).

A standardization effort is being carried out on detailed technical specifications of the W-CDMA in the 3GPP (the Third Generation Partnership Project), and also a standardization of the HSDPA (the High Speed Downlink Packet Access) for implementing high-speed downlink packet transmission at an even higher rate of 10 Mbps is being carried out.

Moreover, for the purpose of transmitting packet data in a high-speed packet transmission downlink, the cdma 2000 1×EV HDR (High Data Rate) is being studied by the 3GPP2, enabling an implementing of high-speed packet transmission at a maximum rate of information transmission of 2.4 Mbps (refer to Non-Patent Document 1, for example) according to the HDR.

In the high-speed packet transmission as described above, applying of technologies such as Adaptive Modulation and Coding (AMC) based on adaptive wireless-link control (a link adaptation) and Automatic Repeat Request error-control schemes (refer to Non-Patent Document 2, for example) is being studied. The Adaptive Modulation and Coding based on the link adaptation is a method of switching the number of levels in multilevel data modulation, the Spreading Factor (SF), the number of code channels multiplexed, as well as the error-correction code rate depending on the propagation environment of each user, in order to efficiently conduct high-speed data transmission. For the data modulation, increasing the maximum throughput of the system is enabled by switching to a more efficient multi-level modulation, for example, 8PSK, 16QAM, or 64QAM modulation, from QPSK modulation used in the current W-CDMA, as the propagation environment gets better. As an example, ultra-high speed data transmission at 10.8 Mbps is enabled by using a W-CDMA wireless interface at a chip rate of 3.84 Mcps when using 64QAM for the data modulation, assuming SF=16, the number of code channels multiplexed being 10, and the error-correction code rate of ¾.

In order to efficiently implement these transmissions as described above, high-speed packet scheduling is required such that a base station monitors by time slot the state of the propagation path of a mobile station connected to the base station as described above and transmits packets at high speed based on the outcome of the monitoring. In the Non-Patent Document 1 concerning the HDR as described above, a method of maximizing the throughput within a sector by transmitting packets to a mobile station with the best reception characteristics is proposed. However, with this method, unfairness is caused such that packets are not transmitted depending on the mobile station. Therefore, in order to correct for this unfairness, a method is required of taking a ratio of the average of previous transmission rates and an instantaneous transmission rate (the instantaneous transmission rate determined depending on the state of the propagation path at that time), and transmitting packets to a mobile station with a large value of the ratio (refer to Non-Patent Document 3, for example). According to this method, both improving the sector throughput and maintaining fairness among the mobile stations are enabled.

Now, in order to provide full-fledged multimedia services such as a bi-directional video telephone service and a video streaming service, it is necessary to contain the packet transmission delay to within a tolerance demanded by the services for realizing a required transmission rate. However, in the two methods as described above, the probability of not being able to fulfill the quality requirement demanded by the services increases as transmission control taking into account the transmission delay and the required transmission rate is not performed. In general, when scheduling is performed taking into account only the delay tolerance and the required transmission rate, the throughput of the overall system is reduced in comparison with a case wherein the scheduling is performed taking only the reception state into account. To the contrary, a method is proposed such that, for communications not meeting the required quality, by taking into account the reception state of the destination mobile station, the throughput of the overall system is improved while fulfilling the required quality of each communication (refer to Non-Patent Document 4, for example).

Non-Patent Document 1

CDMA/HDR: A Bandwidth-Efficient High-Speed Wireless Data Service for Nomadic Users, Paul Bender, Peter Black, Matthew Grob, Roberto Padovani, Nagabhushana Sindhushayana, and Andrew Viterbi-IEEE Communications Magazine, July 2000

Non-Patent Document 2

Symbol Rate and Modulation Level Controlled Adaptive Modulation/TDMA/TDD for High-Bit-Rate Wireless Data Transmission, T. Ue, S. Sampei, and N. Morinaga: IEEE Transactions on Vehicular Technology, pp. 1134-1147, vol. 47, no. 4, November 1998

Non-Patent Document 3

Data Throughput of CDMA-HDR High Efficiency-High Data Rate Personal Communications Wireless System, A. Jalali, R. Padovani and R. Pankaj, IEEE $51^{st}$ Vehicular Technology Conference, May 2000

Non-Patent Document 4

Ono et al., "Proposal of ALL IP Mobile Network Architecture (Part 3)—Study of QoS-guaranteed Packet Scheduler in Base Station", Technical Report of IEICE, MoMaC 2002-3

However, in the related-art method as described in the Non-Patent Document 4, as the reception state of the destination mobile station for communication with a packet-transmission priority is not taken into account, the overall system throughput may end up decreasing when communications not fulfilling the required quality increase due to an increase in traffic, etc. Therefore, there is a problem such that the probability of packet loss increases, especially in a service with a strict requirement for the delay since the quality at one time falls below the required quality level in order for a packet of a given communication to be transmitted with a priority.

SUMMARY OF THE INVENTION

It is a general object of the present invention to provide a wireless packet communication apparatus and method that substantially obviate one or more problems caused by the limitations and disadvantages of the related art.

In light of the problems as described above, it is a more particular object of the present invention to provide a wireless packet communication apparatus and method that enable highly-efficient transmission while fulfilling a required condition for the packet transmission delay.

According to the invention, an apparatus for packet-priority control for controlling priority for packets input includes packet-priority setting means configured to set into a hierarchy the priority for the packet input based on predetermined elements, and to adjust taking into account other elements according to which the priority for the packet varies over time, the set priority, and wireless-resource allocating means configured to determine a packet for which a wireless resource is to be allocated in accordance with said adjusted priority.

The apparatus for packet-priority control in an embodiment of the invention enables highly-efficient transmission while fulfilling a required condition for the packet transmission delay.

According to the invention, a method of packet-priority control for controlling a priority for packets input includes the steps of setting into a hierarchy the priority for the packet input based on predetermined elements, adjusting, taking into account other elements according to which the priority for the packet varies over time, the set priority, and determining a packet for which a wireless resource is to be allocated in accordance with the adjusted priority.

The method of packet-priority control in an embodiment of the invention enables highly-efficient transmission while fulfilling a required condition for the packet transmission delay.

Other objects and further features of the present invention will be apparent from the following detailed description when read in conjunction with the accompanying drawings.

BRIEF DESCRIPTION OF THE DRAWINGS

FIG. 15 is a diagram for describing a condition enabling a simultaneous transmission for multiple mobile stations, in the base station illustrated in FIG. 14.

DETAILED DESCRIPTION OF PREFERRED EMBODIMENT

In the following, embodiments of the present invention are described with reference to the accompanying drawings.

Figure 1:
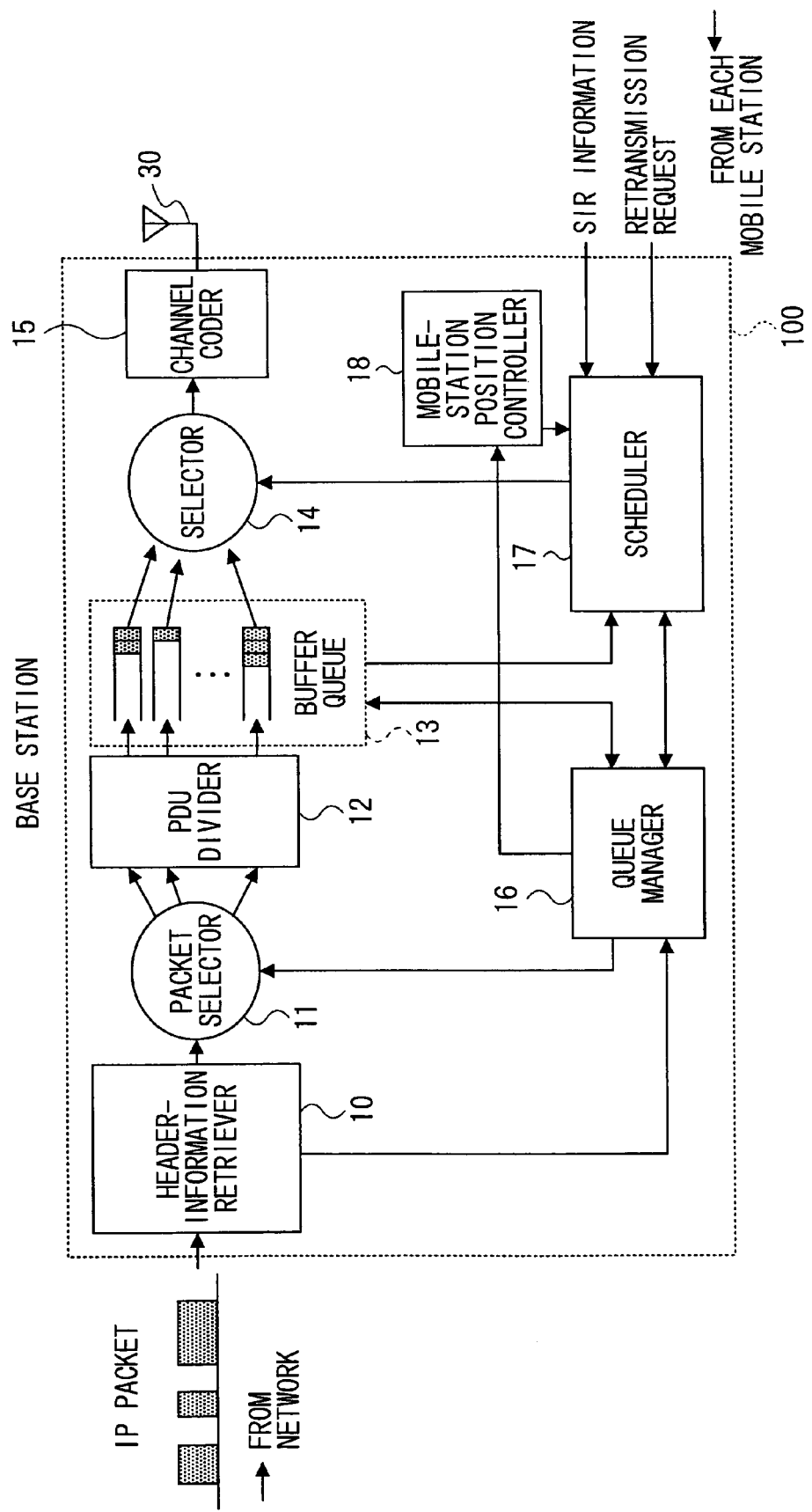
FIG. 1 is a block diagram illustrating an example configuration of a packet priority control apparatus to which a packet priority control method according to an embodiment of the present invention is applied.

A packet-priority control apparatus to which a packet-priority control method is applied in an embodiment of the present invention is configured as illustrated in FIG. 1, for example. This packet-priority control apparatus, connected to a network (an IP network, for example), receives an IP packet (below abbreviated "packet") from the network so as to perform priority control on the IP packet for transmitting to a receiving station. In the present example, it is assumed that the packet-priority control apparatus is a base station of a mobile communications system, and that the receiving station is a mobile station (for example, a mobile telephone, a portable data terminal, etc.).

In FIG. 1, a base station 100 consists of a header-information retriever 10, a packet selector 11, a PDU divider 12, a buffer queue 13, a selector 14, a channel coder 15, a queue manager 16, a scheduler 17, a mobile-station position controller 18, and a transmitting antenna 30.

The header-information retriever 10 retrieves, for a packet arriving at the base station 100, header-information items such as source and destination addresses (Mobile station ID's), service type, and packet outgoing time at the source. The packet selector 11 apportions the packet to an applicable queue in the buffer queue 13 based on the header-information items retrieved at the header-information retriever 10. The PDU divider 12 divides the packet into PDUs, the PDU being a unit of data transfer in a wireless section, before apportioning the packet to the queue. The queue in the buffer queue 13, set up in a predetermined memory, stores the packet divided into the PDUs for each set of data belonging to the same communication. The queue manager 16 keeps information items of source and destination addresses (for example, mobile station IDs) of the packet stored in each queue, the traffic type, outgoing time at the source, etc. and manages the average transmission rate of the packet outgoing from the queue. The scheduler 17 computes for each communication the priority value for allocating a wireless resource, determines a communication for allocating the wireless resource and the amount of the wireless resource based on the priority value, and signals the determined outcome to the selector 14. The selector 14, based on the signaled outcome from the scheduler 17, retrieves packet data of the amount designated from the applicable queue of the buffer queue 13 for outputting to the channel coder 15. The packet input to the channel coder 15 undergoes a process of error-correction coding, etc. for transmitting to a receiving mobile station via the transmitting antenna 30.

Figure 2:
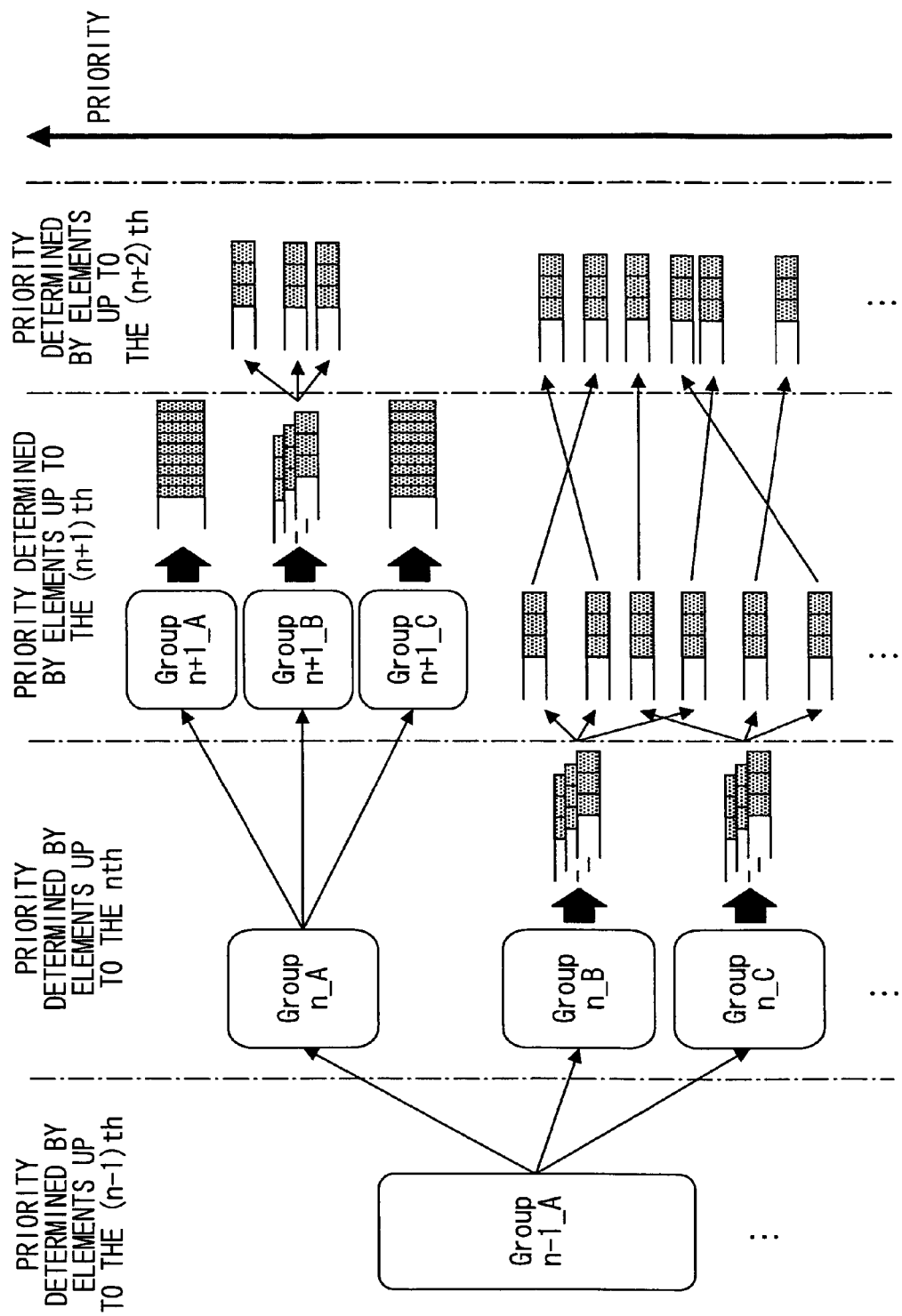
FIG. 2 is a diagram for describing the concept of a packet-priority control process of the present invention for determining a priority of a packet input into a base station taking into account multiple priority elements.

FIG. 2 is a diagram for describing the concept of a packet-priority control process of the present invention for determining a priority of a packet input into a base station taking into account multiple priority elements.

In the packet priority control in the present invention, the packet arriving at the base station is classified according to multiple elements into one of groups each belonging to a hierarchical level and having a different priority. Below a specific example is described.

In the present embodiment, it is assumed that a packet arriving at a base station that is addressed to a certain user is classified into a Group n−1_A. This Group n−1_A belongs to the (n−1)th highest hierarchical level, is classified according to an element "A", for example, and is grouped as a group having a certain priority.

The packet belonging to the Group n−1_A is, then, at the next hierarchical level (n-th level), divided into 3 groups (Group n_A, Group n_B, and Group n_C) according to three elements of "A", "B", and "C" each group classified as a group having a different priority. In the present embodiment, it is envisioned that the same hierarchical level is classified into multiple groups according to the same elements, each group having a different priority. Thus, while Group n_A, Group n_B, and Group n_C are classified according to the same elements, the priorities for each group are different.

It is determined whether the 3 groups classified as described above are subsequently further grouped at a lower hierarchical level depending on whether new elements are taken into account. In the present example, for Group n_A, new elements are further taken into account, resulting in a segmenting into 3 groups, Group n+1_A, Group n+1_B, and Group n+1_C. On the other hand, for Group n_B and Group n_C, further new elements are not taken into account.

In the present embodiment, a non time-varying element, such as a packet-delay tolerance or a type of service used (for example, QoS), etc., is set for an upper hierarchical level. Hereby, classifying of packets addressed to the same user into the same group is enabled.

Subsequently, a queue is formed for a packet belonging to Group n+1_A and Group n+1_C for transmitting in order starting from a packet with a higher priority. On the other hand, for a packet belonging to Group n+1_B, Group n_B, and Group n_C, a queue is formed together by those packets with the same user destination, a priority is determined, for each queue, according to a further element such that the priority of each packet is time-varying (for example, the receiving quality of a destination terminal and an elapsed time from the packet-outgoing time, etc.) for transmitting each packet in the priority order determined. Herein, depending on the priority for the element to be taken into account switching of the priority is tolerated with a queue belonging to an upper-level group.

Thus in packet-priority control in the present embodiment, when determining packet priority, multiple priority-determining elements are taken into account so as to determine the packet priority hierarchically. In other words, priority is set depending on a delay tolerance for each communication, enabling containing the impact on the throughput to a minimum, resulting in enabling the realizing of highly efficient packet transmission.

Figure 3:
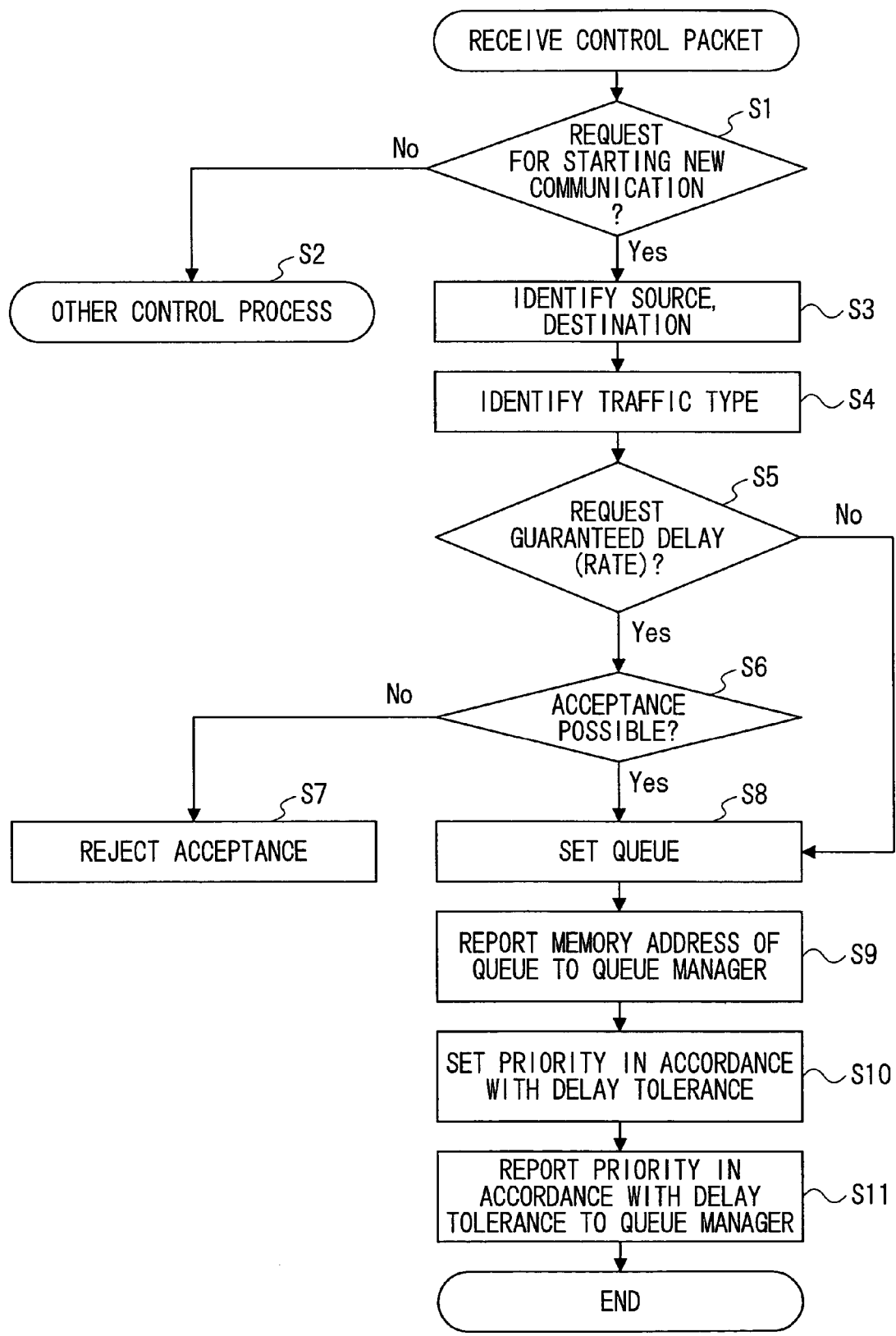
FIG. 3 is a flowchart illustrating a process at the base station at the time of starting a communication for setting in a memory a queue for storing packet data.

FIG. 3 is a flowchart illustrating a process at the base station at the time of starting a communication for setting in a memory a queue for storing packet data.

In FIG. 3, the header-information retriever 10 of the base station 100, at the time of starting a communication, upon receiving a packet arriving from the network side, retrieves a header-information item from the received packet for confirming from the retrieved header-information item whether the arrived packet is a control packet containing a control-information item. Herein, when the confirmed packet is a control packet for requesting the starting of a new communication (YES in step S1), source and destination are identified from the control packet (step S3), and then the traffic type is identified (step S4). It is to be noted that another control process is executed (step S2) when the packet arriving from the network side is not a control packet indicating a request for starting a new communication (NO in step S1).

In step S5, requested conditions for transmission delay such as a delay tolerance are identified from the traffic type identified in step S4 for determining whether a call requesting for starting the new communication is a call requesting a guaranteed delay (requesting a guaranteed data-rate), for example, one requesting real-time or a strict limitation on response time. With this determination, when the call as described above is determined to be a call requesting the guaranteed delay (YES in step S5), whether there is an unallocated resource fulfilling the requested conditions of the guaranteed delay and a guaranteed minimum bandwidth is determined, and if it is affirmative, an acceptance of the call as described above is determined to be possible (YES in step 6), proceeding to step S8. On the other hand, in step S6, if it is negative, the acceptance of the call as described above is determined to be impossible (NO in step S6), executing a process of rejecting the acceptance (step S7).

Moreover, in step S5, when it is determined that the call as described above is not a call requesting the guaranteed delay (NO in step S5), the process proceeds to step S8, skipping a determination on the possibility of the call acceptance in step S6.

In step S8, a queue for storing a packet transmitted in the communication having a request for starting the new communication is set in a predetermined memory within the buffer queue 13 so that address information of the set queue is reported from the header-information retriever 10 to the queue manager 16 (step S9).

The header-information retriever 10 sets the priority value based on the delay tolerance specified from the traffic type identified in step S4 (step S10) for reporting the set priority value as described above to the queue manager 16 (step S11). Subsequently, in the queue manager 16, address information of the applicable queue of the buffer queue 13, address information of the source and the destination of the communication, the priority value based on the delay tolerance, and the requested guaranteed-minimum bandwidth, etc., are associated for keeping and managing.

Figure 4:
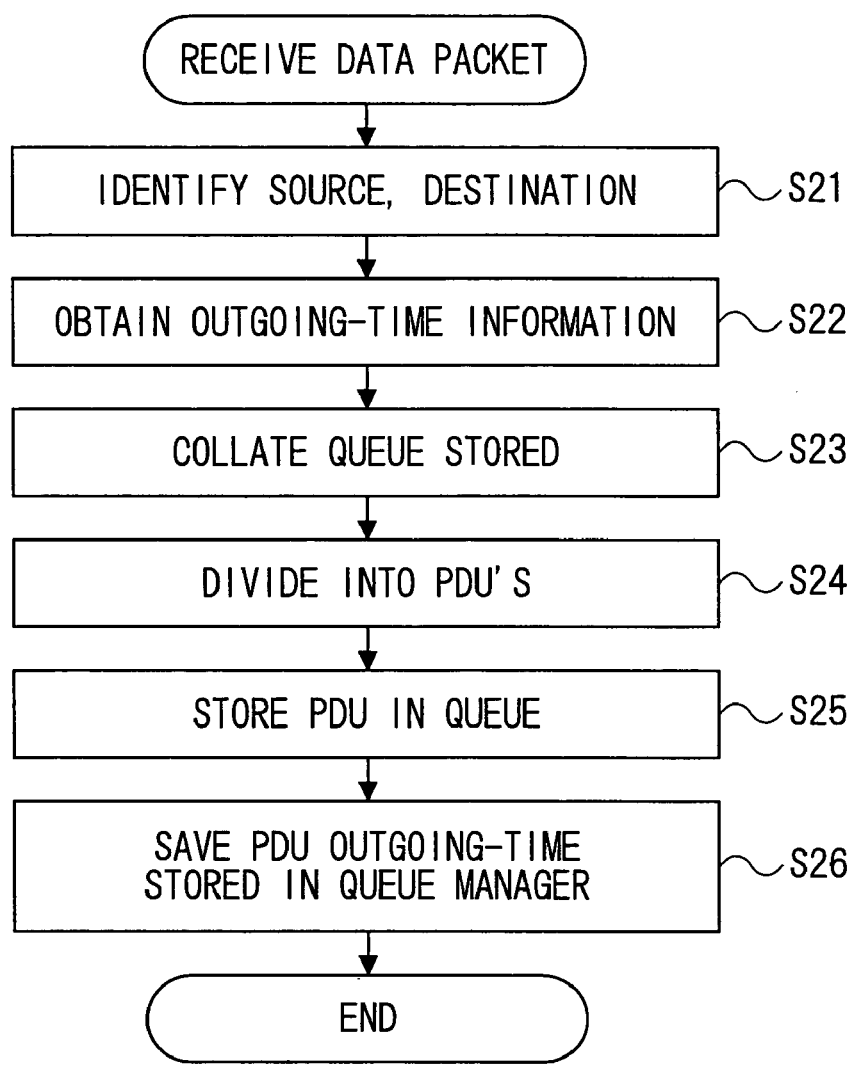
FIG. 4 is a flowchart illustrating a process at the base station during the communication for storing a packet received from a network in an appropriate queue.

FIG. 4 is a flowchart illustrating a process at the base station during a communication for storing a packet received from a network in an appropriate queue. Herein, a case is envisioned such that the packet arriving at the base station 100 from the network is a packet addressed to a mobile station already starting the communication, the below providing the description.

In FIG. 4, the header-information retriever 10 of the base station 100 identifies a source and a destination from a header-information item of the packet received (step S21) for reporting the outcome of the identification to the packet selector 11. Moreover, the header-information retriever 10 retrieves information of outgoing time at the source (outgoing-time information) from the header-information item of the received packet (step S22) for reporting the outcome of the retrieval to the queue manager 16.

The packet selector 11 collates information of the source and the destination from the header-information retriever 10 and information of the applicable queue of the buffer queue 13 managed at the queue manager 16 (including outgoing-time information) (step S23) for apportioning the packet as described above to the set queue for the communication as described above. The packet apportioned at the packet selector 11 as described above is subsequently divided into PDUs (Protocol Data Units), the PDU being a unit of data transfer in a wireless section, in the PDU divider 12 (step S24) for storing at the end of an applicable queue (step S25).

On the other hand, the queue manager 16 associates the outgoing-time information as described above with the divided PDUs for keeping the associated information (step S26). It is to be noted that a packet awaiting transmission stored in an applicable queue is awaiting transmission until it is allocated a wireless resource by the scheduler 17.

Figure 5:
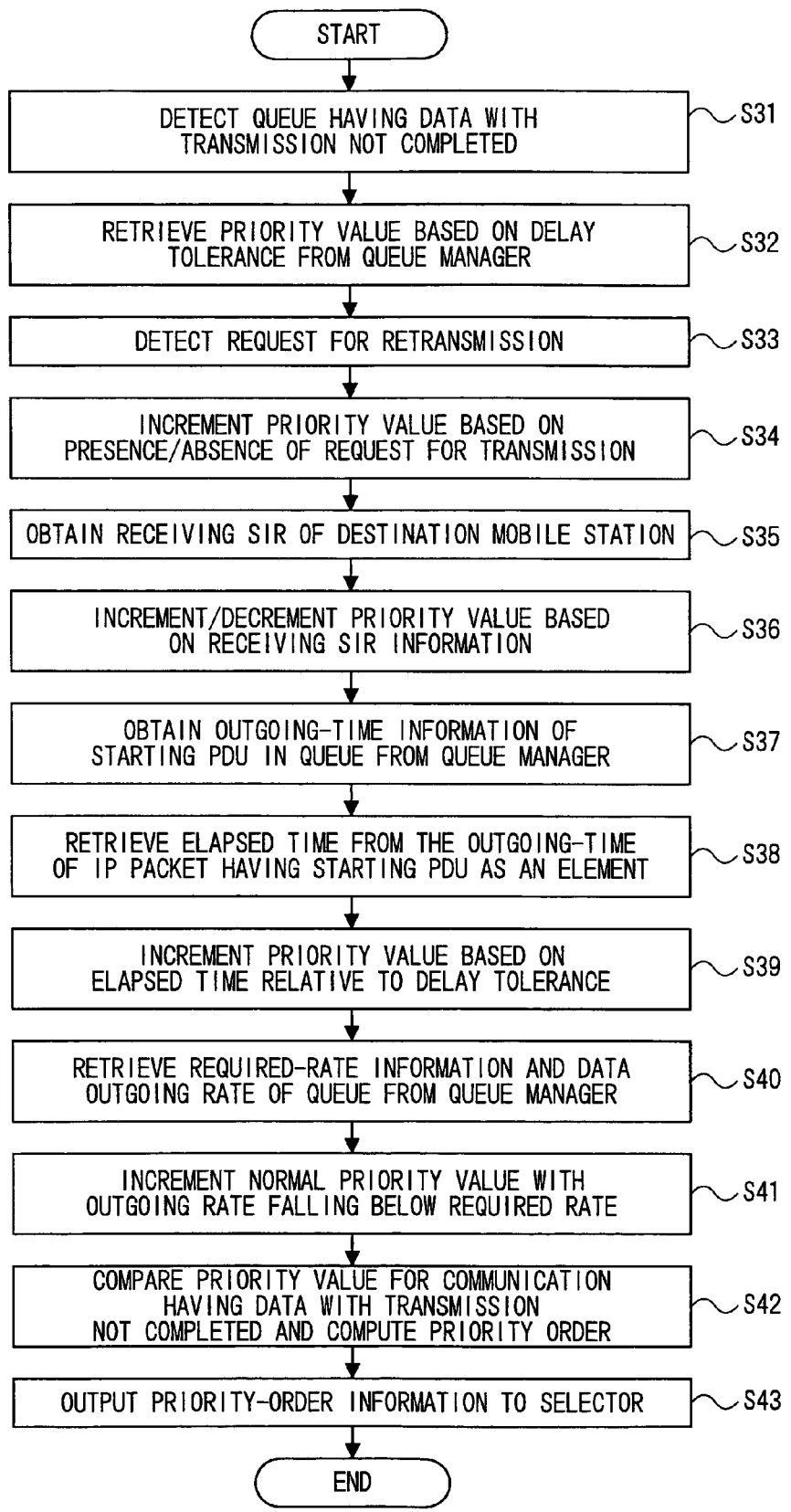
FIG. 5 is a flowchart illustrating a process at the base station for determining a priority for allocating a wireless resource for each communication.

FIG. 5 is a flowchart illustrating a process at the base station for determining a priority for allocating a wireless resource for each communication.

In FIG. 5, the scheduler 17 of the base station 100 detects a queue having a PDU with transmission not completed from the buffer queue 13 (step S31), and retrieves the priority value based on a delay tolerance associated with the detected queue from the queue manager 16 (step S32).

In step S33, the scheduler 17 detects whether there is a request for retransmission for the detected queue as described above sent from the mobile station, for reporting the outcome of the detection to the queue manager 16. This request for retransmission is to be sent to the base station 100 when detecting a data-receiving error, transmitted PDU by PDU.

The queue manager 16 receives the request for retransmission from the scheduler 17, identifies the queue originating the outgoing PDU requesting retransmission, for increasing the priority value for a communication using an applicable queue (step S34). Herein, the incremental amount of the priority value is determined based on the delay tolerance of the applicable queue as described above.

The priority value incremented at the queue manager 16 as described above is reported to the scheduler 17.

In step S35, the scheduler 17 retrieves an information item regarding the reception state of a destination mobile station of each communication (for example, the receiving SIR (Signal-to-Interference Ratio), for increasing/decreasing the priority value as described above, depending on the retrieved reception state (step S36). Herein, the increased/decreased amount of the priority value as described above differs depending on the delay tolerance of the applicable queue. It is to be noted that the receiving SIR as described above is wirelessly transmitted to the base station 100 from each mobile station for sending to the scheduler 17.

In step S37, the scheduler 17 retrieves from the queue manager 16 an outgoing-time information item of a packet, having as an element a PDU with transmission not completed stored at the start of a queue of the buffer queue 13. In step S38, an information item of an elapsed time period starting from the outgoing time of the packet as described above at the source is retrieved.

The scheduler 17 increases the priority value as described above based on the elapsed time period information item retrieved as described above (step S39). Herein, the incremental amount of the priority value is determined in accordance with the delay tolerance of the applicable queue.

In step S40, the scheduler 17 retrieves required-rate information of the applicable queue (herein called the target transmission rate) and information on the current data outgoing rate (herein called the current average transmission rate) from the queue manager 16, and in step S41 increases the priority for a communication of a queue with the current average transmission rate falling below the target transmission rate. To the contrary, the priority is decreased for a communication of a queue with the current average transmission rate exceeding the target transmission rate.

In step S42, the scheduler 17 compares the priority value for a communication of a queue having a PDU with transmission not completed, for determining a priority order for allocating a wireless resource for the communication as described above. Then, the information on the priority order for allocating the wireless resource determined herein is output to the selector 14 (step S43).

Thus, in the present embodiment, the scheduler 17 determines an allocating of a wireless resource to a PDU awaiting transmission in a queue used with a communication of a high-priority order, enabling a substantial reducing of the call loss in a communication of a high-priority order. Therefore, according to the present embodiment, a more efficient packet transmission is enabled.

Figure 6:
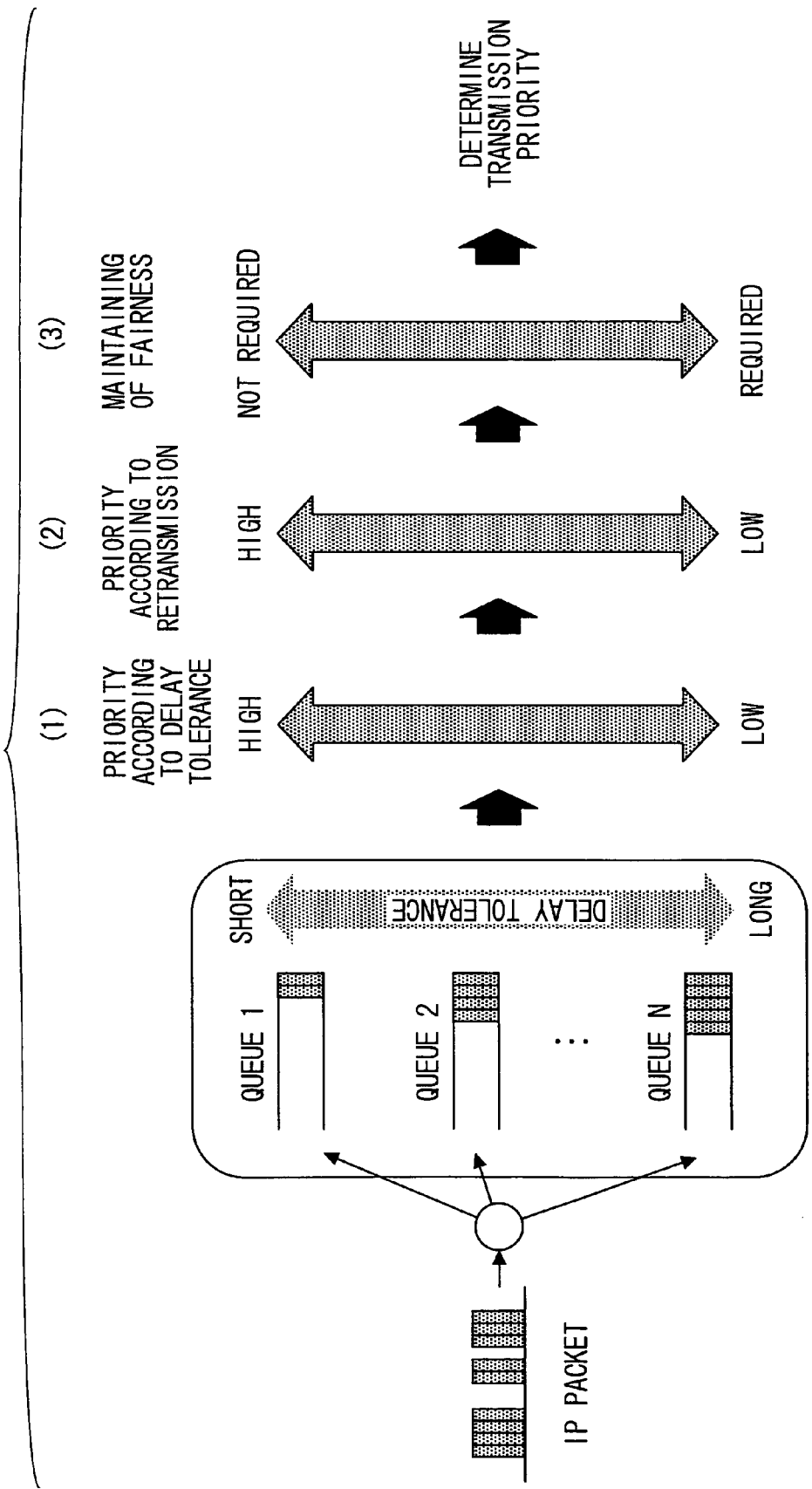
FIG. 6 is a diagram for describing the course of determining a priority for each packet.

FIG. 6 is a diagram for describing the course of determining a priority for each packet when allocating a wireless resource to each communication.

As illustrated in FIG. 6, in the present invention, attaching primary importance to the delay tolerance for realizing the delay requirement, a high priority is set for a queue storing a PDU with a short delay tolerance (1). Moreover, a higher priority is given for a queue storing a PDU having a request for retransmission in order to shorten the delay due to retransmission (2). Furthermore, in order to transmit a packet at a timing such that the reception state of a transmitting mobile station is as good as possible, the reception state of the destination mobile station is taken into account (3). In other words, a mobile station with a good reception state is selected as much as possible while maintaining fairness with a mobile station having a poor reception state.

Thus in the present embodiment, the priority-determining elements as described above are taken into account for determining a packet transmission priority.

Figure 7:
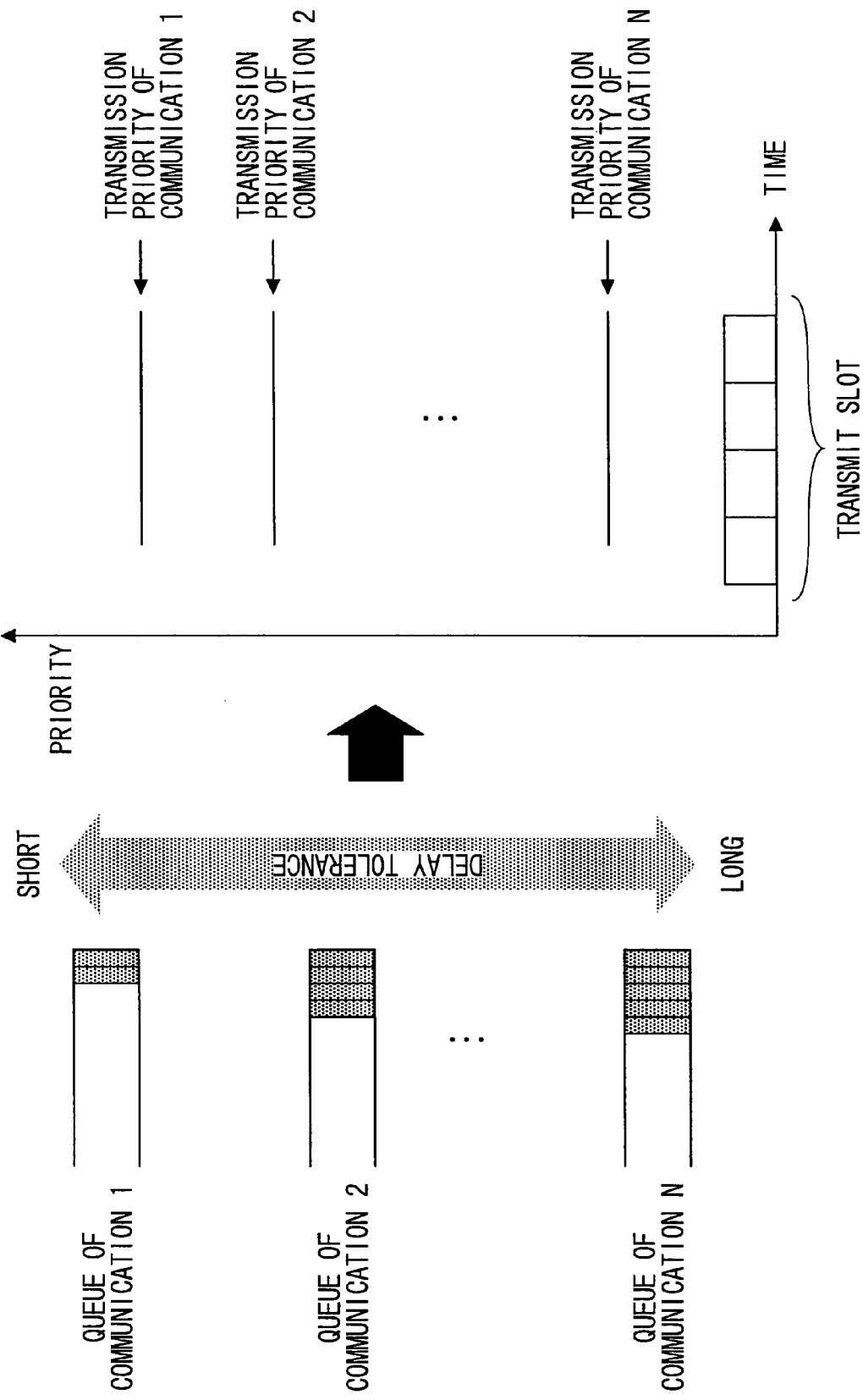
FIG. 7 is a diagram illustrating a method of determining a priority based on a delay tolerance.

Next, with reference to FIG. 7, a method of determining the transmission priority when the determining element of the transmission priority is set to be "the delay tolerance" is described. The priority value based on the delay tolerance is set simultaneously with a queue at the time of starting the communication such that the shorter the delay tolerance of the communication using the applicable queue of the buffer queue 13 the larger the priority value for the applicable queue. For example, in the example in FIG. 7, in the order of a queue of communication 1, then a queue of communication 2, and then a queue of communication N, the priority values are set in an order of 5, then 4, and then 3 (each of the numerical values is provided as an example).

Figure 8:
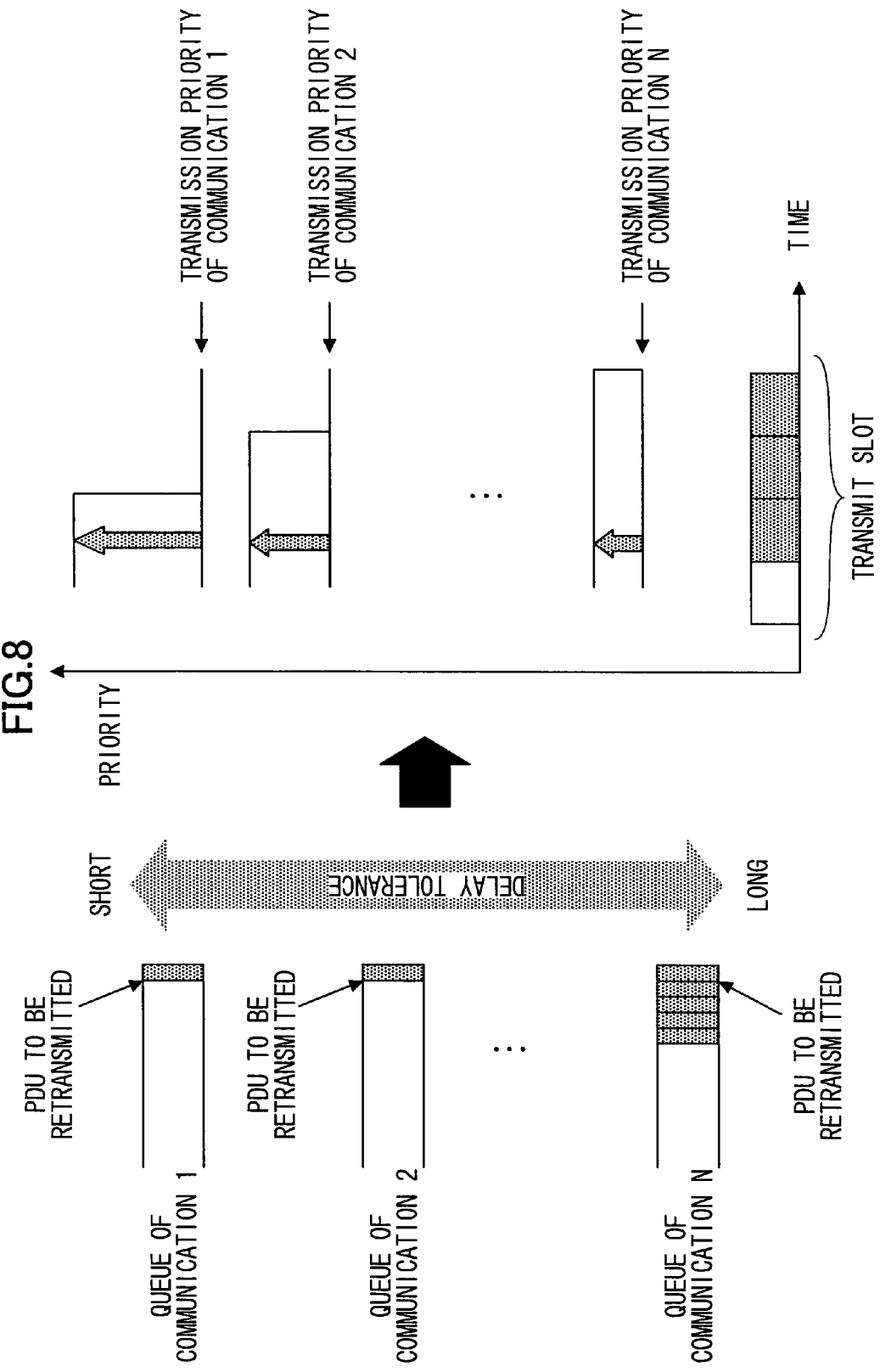
FIG. 8 is a diagram for describing a method of determining the priority based on a request for retransmission.

Next, with reference to FIG. 8, a method is described for determining a transmission priority when the determining element of the transmission priority is set to be "the request for retransmission". The priority value for the request for retransmission is set such that until the PDU stored in the applicable queue of the buffer queue 13 to be retransmitted is retransmitted, the priority value according to the retransmission is incremented so as to be set to the priority value set based on the delay tolerance. In the example in FIG. 8, a queue having a PDU to be retransmitted exists for each communication (communication 1 through communication N), the queue of the communication 1 being the queue having a PDU with the shortest delay tolerance out of the queues of each communication, and then the delay tolerance for the PDU to be retransmitted becoming longer in the order of the communication 2 and then the communication N.

When such queues exist, in the present embodiment, the priority according to retransmission is incremented depending on the delay tolerance set for each of the queues. For example, in the present example, as the delay tolerance of the queue of the communication 1 is the shortest, the incremental amount of the priority value according to retransmission is the largest as illustrated in the right-hand portion of FIG. 8. Then, the incremental amount of the priority value according to retransmission decreases in the order of the queue of the communication 2, ..., the queue of the communication N. In other words, in the order of the communication 1, 2, ..., N, the PDU to be retransmitted is allocated to a transmit slot for transmission.

Thus, in the present embodiment, incrementing the priority value for a communication having a request for retransmission for allocating a resource with priority enables shortening the transmission delay of a packet having as an element a PDU to be retransmitted. Herein, while the incremental amount of the priority may be set to be the same for all communications, allocating with priority a wireless resource for a communication having a request for retransmission increases the probability that a transmission will be made regardless of the reception state of a mobile station to be a destination. Therefore, there is a possibility that a further receiving error will be introduced so as to cause a degradation in the transmission efficiency of the system overall. Therefore, for the incremental amount of the priority value for a communication having a request for retransmission, the incremental amount of the priority value is made smaller, the longer the delay tolerance of the communication of the applicable queue and the smaller the need for shortening the transmission delay; and the incremental amount of the priority value is made larger for a communication with a short delay tolerance so as to enable an instantaneous executing of retransmission for a request for retransmission. It is to be noted that the PDU to be retransmitted in each queue is stored at the start of the queue so that the incremented priority value is reverted after a transmit slot is allocated.

Figure 9:
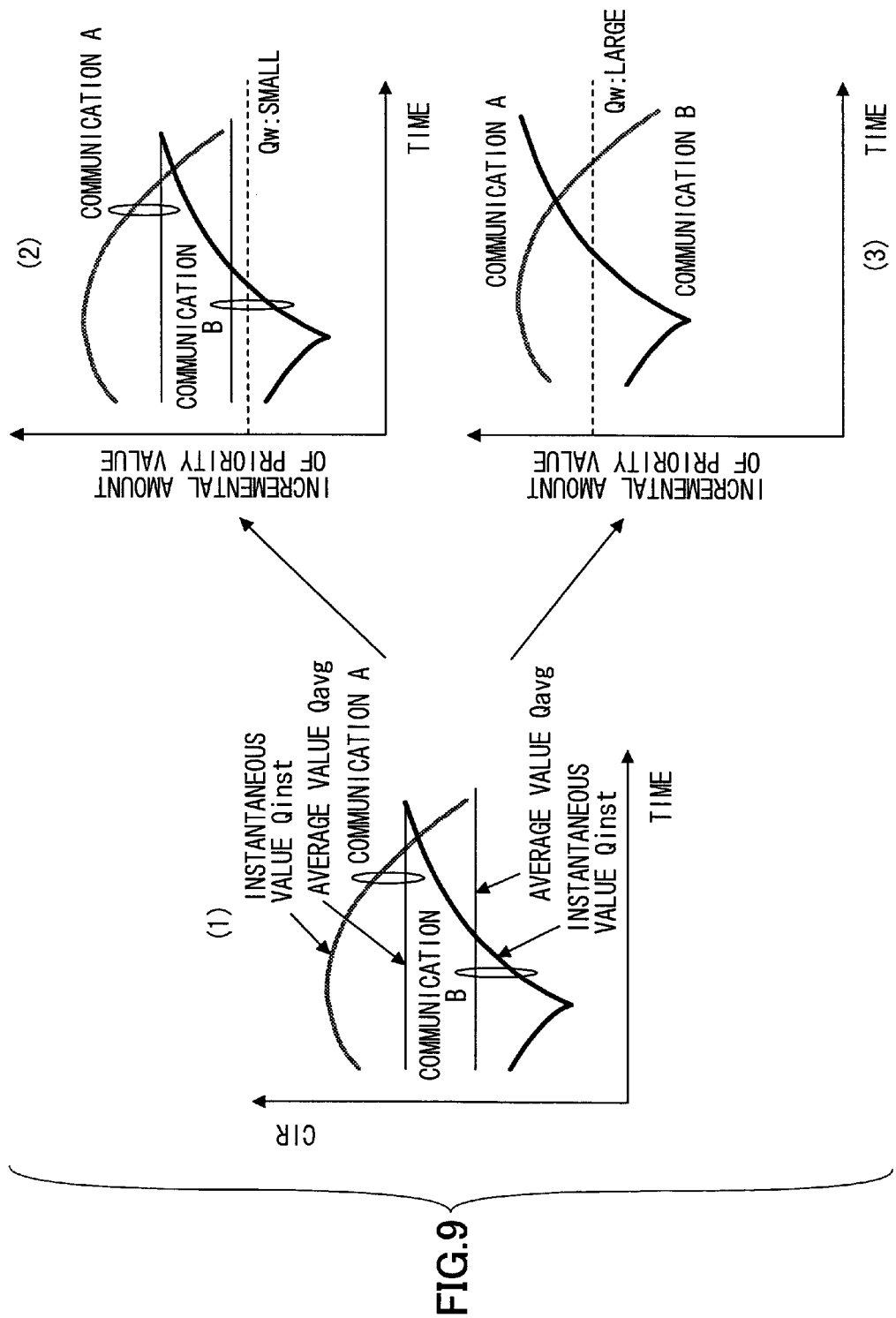
FIG. 9 is a first part of a diagram for describing a method of determining a priority based on a reception state of a destination mobile station.
Figure 10:
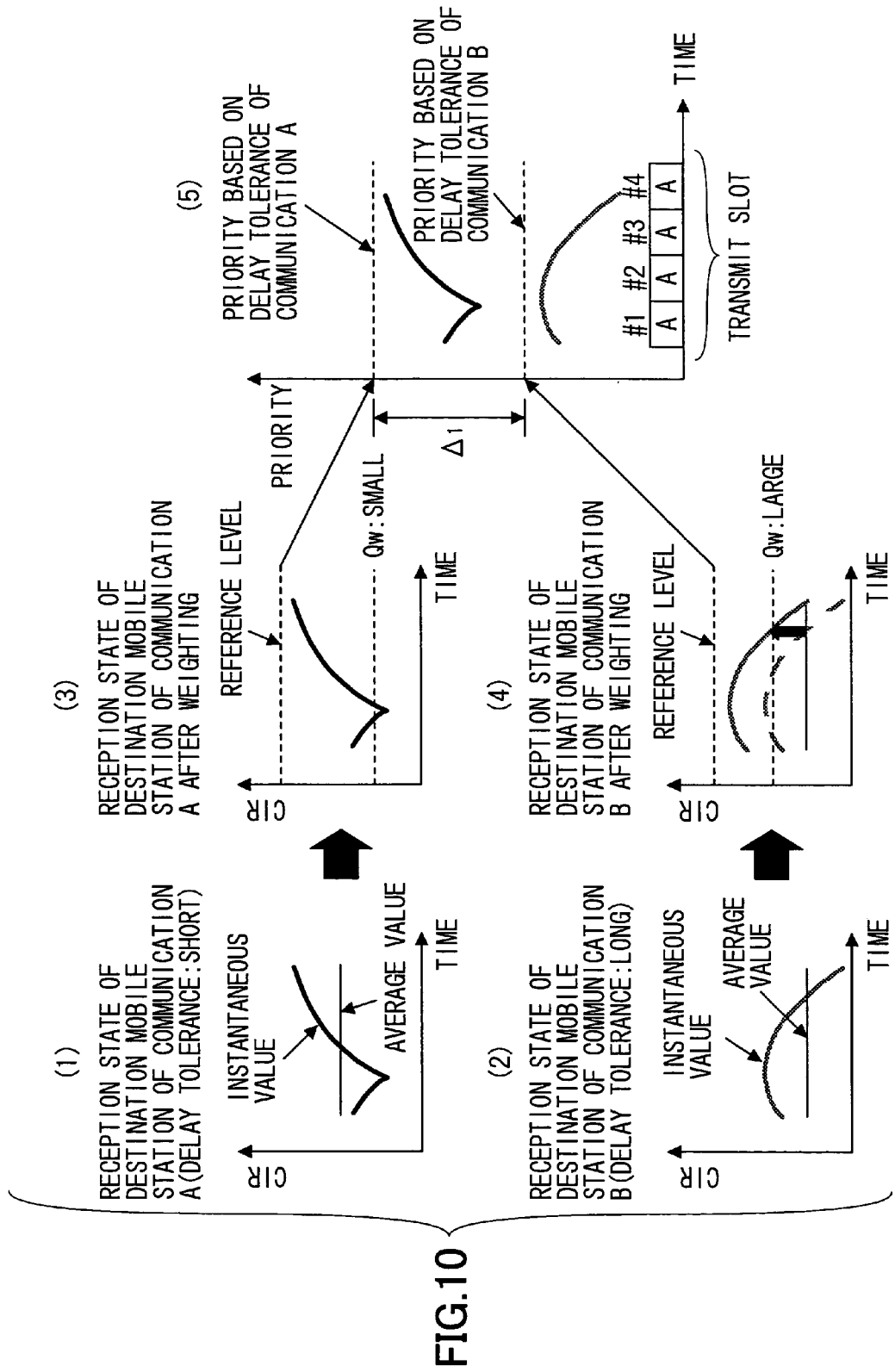
FIG. 10 is a second part of the diagram for describing the method of determining the priority based on the reception state of the destination mobile station.
Figure 11:
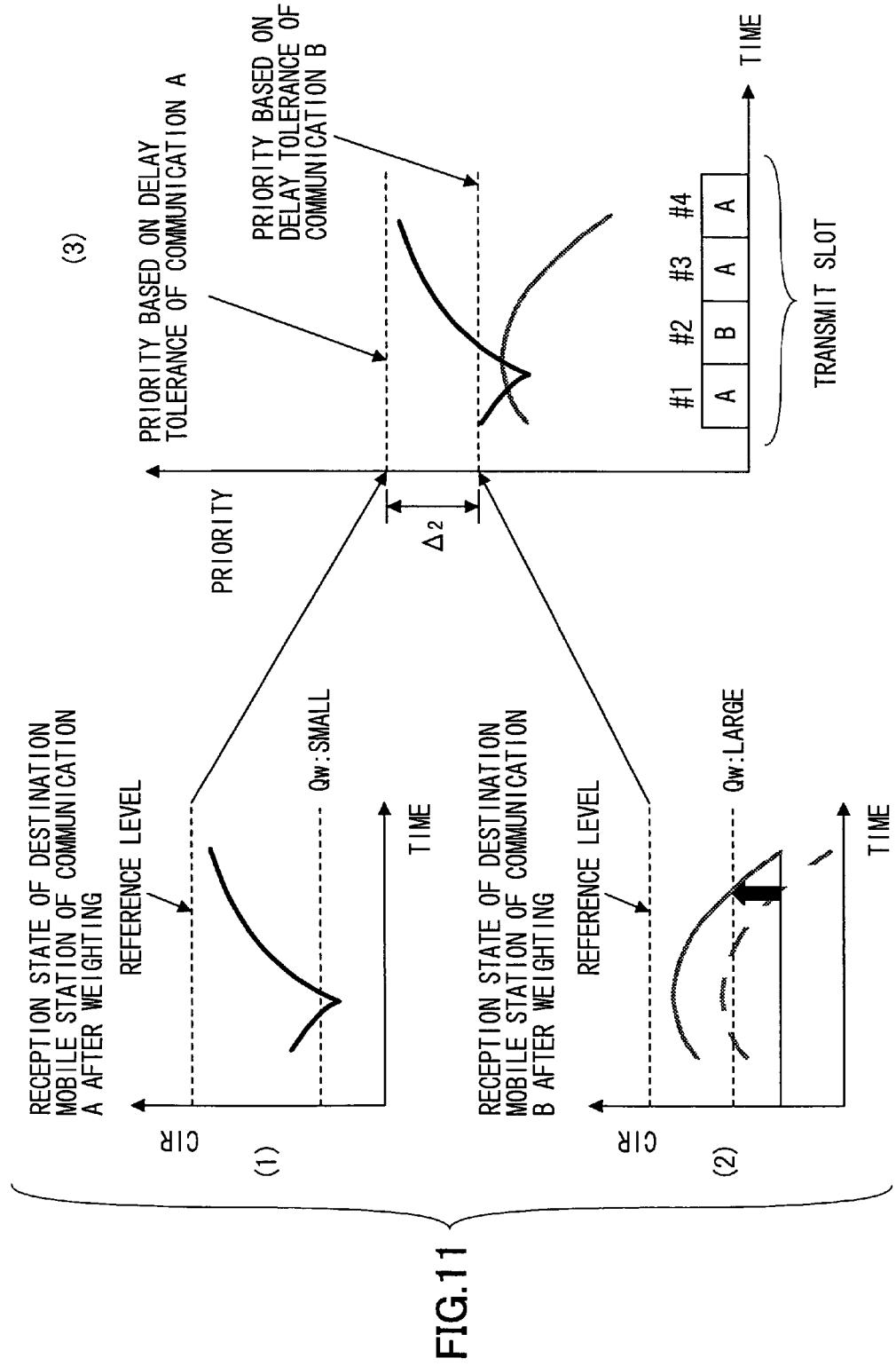
FIG. 11 is a third part of the diagram for describing the method of determining the priority based on the reception state of the destination mobile station.

Next, with reference to FIGS. 9 through 11, a method is described of determining transmission priority of each communication reflecting the reception state of a mobile station to the priority. Herein, for brevity of description, a communication A with a short delay tolerance and a communication B with a long delay tolerance are considered. FIG. 9(1), illustrating the Carrier-to-Interference Ratio (CIR) in an uplink channel with the horizontal axis representing the time and the vertical axis representing the CIR, demonstrates a change in the CIR of the communication A and the communication B.

In the present embodiment, first, the reception state quantified (applying the CIR herein) for each communication (the communication A and the communication B) is subjected to a weighting in accordance with the following expression:

$$\begin{cases} Q_{inst} & (Q_{inst} > Q_w) \\ Q_{inst} / Q_{avg} \bullet Q_w & (Q_{inst} \le Q_w) \end{cases} \quad (7)$$

In the expression as described above, $Q_{inst}$ represents the instantaneous reception state (the CIR), and $Q_{avg}$ represents the average reception state (the CIR). Moreover, $Q_w$ represents the threshold value.

Herein, when considering communications having the same value for the priority value according to the delay tolerance and the presence/absence of the request for transmission, etc., if the value of $Q_w$ is set to a small value, the better the instantaneous reception state $Q_{inst}$, and the larger the incremental amount of the priority value so that the better the average reception state of a destination of a communication the more the opportunity for a wireless resource being allocated. FIG. 9(2) is a diagram demonstrating the circumstances as described above, the vertical axis representing the incremental amount of the priority and the horizontal axis representing the time.

To the contrary, if the value of $Q_w$ is set to a large value, the larger the ratio of the instantaneous reception state to the average reception state, the larger the incremental amount of the priority value so that even with a communication addressed to a mobile station having a poor average reception state, the better the reception state of the mobile station the larger the priority. In other words, securing of an almost-fair opportunity among the mobile stations for allocating a wireless resource is enabled (refer to (3) in FIG. 9).

Now, in a communication with a short delay tolerance, as the amount of data generated per unit time period is limited, there is no need to take into account the fairness of allocating a resource. Therefore, a small $Q_w$ is set, enabling allocating the resource with a higher priority so as to achieve a better instantaneous reception state of a mobile station to which a communication is addressed. On the other hand, for a communication with a long delay tolerance, a large $Q_w$ is set, securing a fair opportunity for allocating the resource among communications with a long delay tolerance.

Moreover, based on the expression (7) as described above, for the weighted reception state (the CIR), an offset is added based on the priority value determined based on a delay tolerance and a request for retransmission. A description is now provided concerning this point with reference to FIGS. 10 and 11.

In FIG. 10(1), illustrating the reception state (the CIR) of a destination mobile station of a communication A, represents a case such that the required delay tolerance is short. FIG. 10(2), illustrating the reception state (the CIR) of a destination mobile station of a communication B, represents a case such that the required delay tolerance is long. In both (1) and (2) of FIG. 10 as described above, the instantaneous value and the average value are represented.

Moreover, in (3) in FIG. 10, illustrating the reception state at the destination mobile station of the communication A after weighting, a small $Q_w$ is set for the communication A. In (4) in FIG. 10, illustrating the reception state in the destination mobile station of the communication B after weighting, a large $Q_w$ is set for the communication B. In this case, $Q_w$ for the communication B is set larger than the average value of the reception state of the communication B, the difference between the level of the average value as described above and the level of $Q_w$ being the amount of the offset so that a curve representing the reception state of the communications B is shifted upward by this amount of the offset (a vertical arrow in (4) in FIG. 10). Herein, when "the reference level" in (3) and (4) is set to be the priority value for each communication based on the delay tolerance, if the difference of the priority value due to the difference in the delay tolerances of the communications, or the difference $\Delta_1$ of the reference level, is set to be large, as illustrated in (5) in FIG. 10, a full priority is given for allocating a resource for a communication with a short delay tolerance. In other words, the communication A is apportioned to the transmit slots (#1 through #4).

On the other hand, as illustrated in FIG. 11, when the difference in the priority values due to the difference in the delay tolerances of the communications (herein corresponding to the difference in the reference levels $\Delta_2$) is set small, even when the priority based on the delay tolerance of the communication A is high as in a second transmit slot (#2), if the reception state of the destination mobile station is poor, even if the delay tolerance is long, a transmission addressed to another mobile station with a better reception state is given a higher priority. Hereby, improving the transmission efficiency of the overall system is enabled.

While a mode of representing the reception state of a mobile station with the receiving CIR is illustrated in an embodiment described with reference to FIGS. 10 and 11, the receiving SIR or the required MCS (Modulation and Channel coding Scheme), etc., may be used as an indicator of the reception state.

In the embodiment as described above, while a mode is illustrated such that the transmission priority of each communication is determined while taking into account the reception state of a mobile station, the present invention is not limited to such a mode. For example, the transmission priority of each communication may be determined based on the elapsed time period from the outgoing time of a packet. Below, a description is provided of this method with reference to FIGS. 12 and 13.

Figure 12:
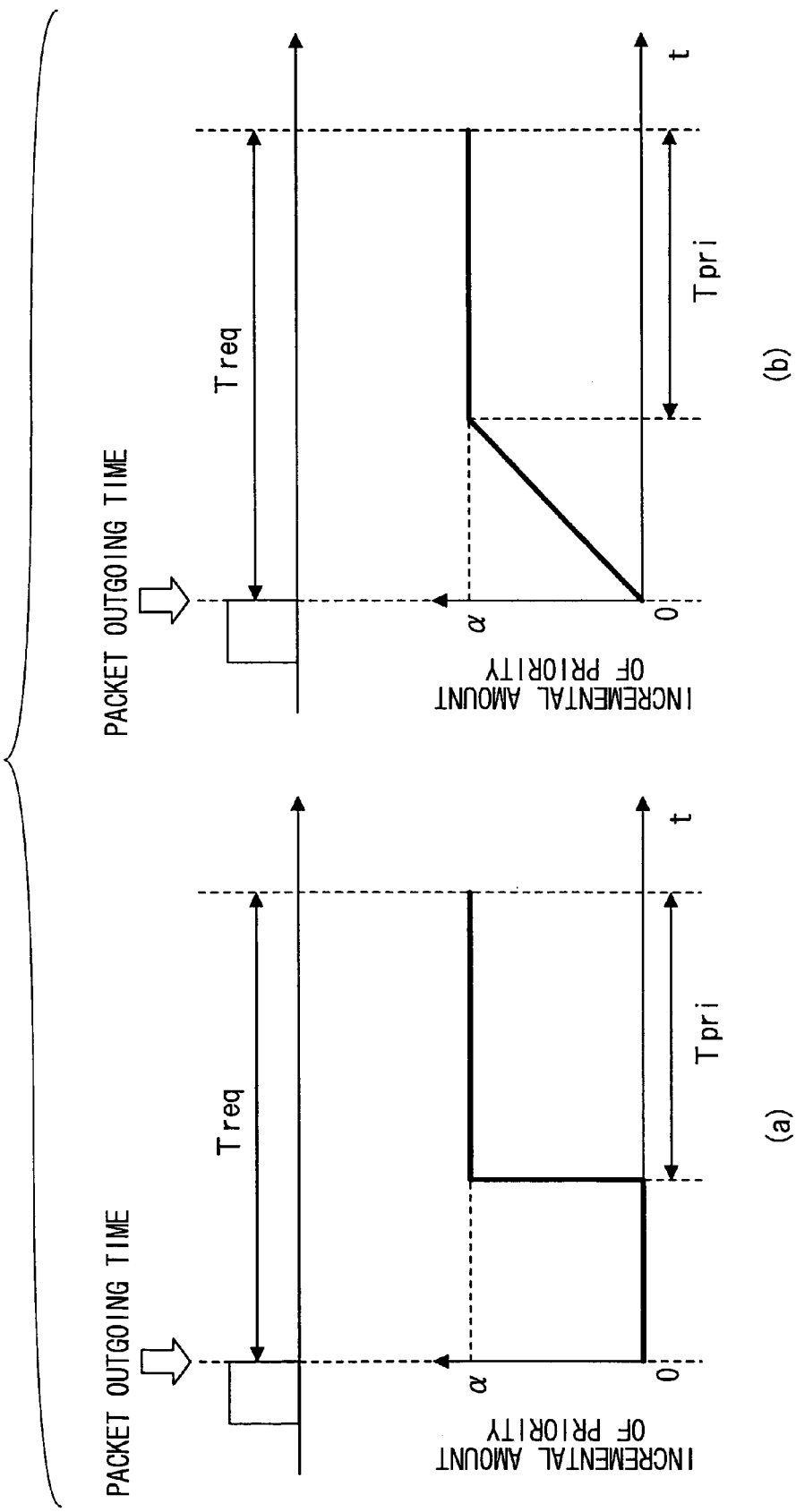
FIG. 12 is a diagram illustrating a change over time of an incremental amount of the priority value based on elapsed time periods according to Expressions (8) and (9)

The priority value based on the elapsed time period from the outgoing time of a packet in the present embodiment is determined depending on the elapsed time period from the time of the packet outgoing from the source, the packet consisting of PDUs stored at the start of each queue. For example, in the present embodiment, as illustrated in FIG. 12, the priority value of each queue is incremented based on expressions below with an increase in the elapsed time period.

FIG. 12(a) demonstrates a change over time in an incremental amount of the priority value based on an elapsed time period according to Expression (8) and FIG. 12(b) demonstrates a change over time in the incremental amount of the priority value based on the an elapsed time period according to Expression (9).

$$\begin{cases} 0 & (t < T_{req} - T_{Pri}) \\ a & (t \geq T_{req} - T_{Pri}) \end{cases} \quad (8)$$

$$\begin{cases} a \bullet t / (T_{req} - T_{Pri}) & (t < T_{req} - T_{Pri}) \\ a & (t \geq T_{req} - T_{Pri}) \end{cases} \quad (9)$$

Figure 13:
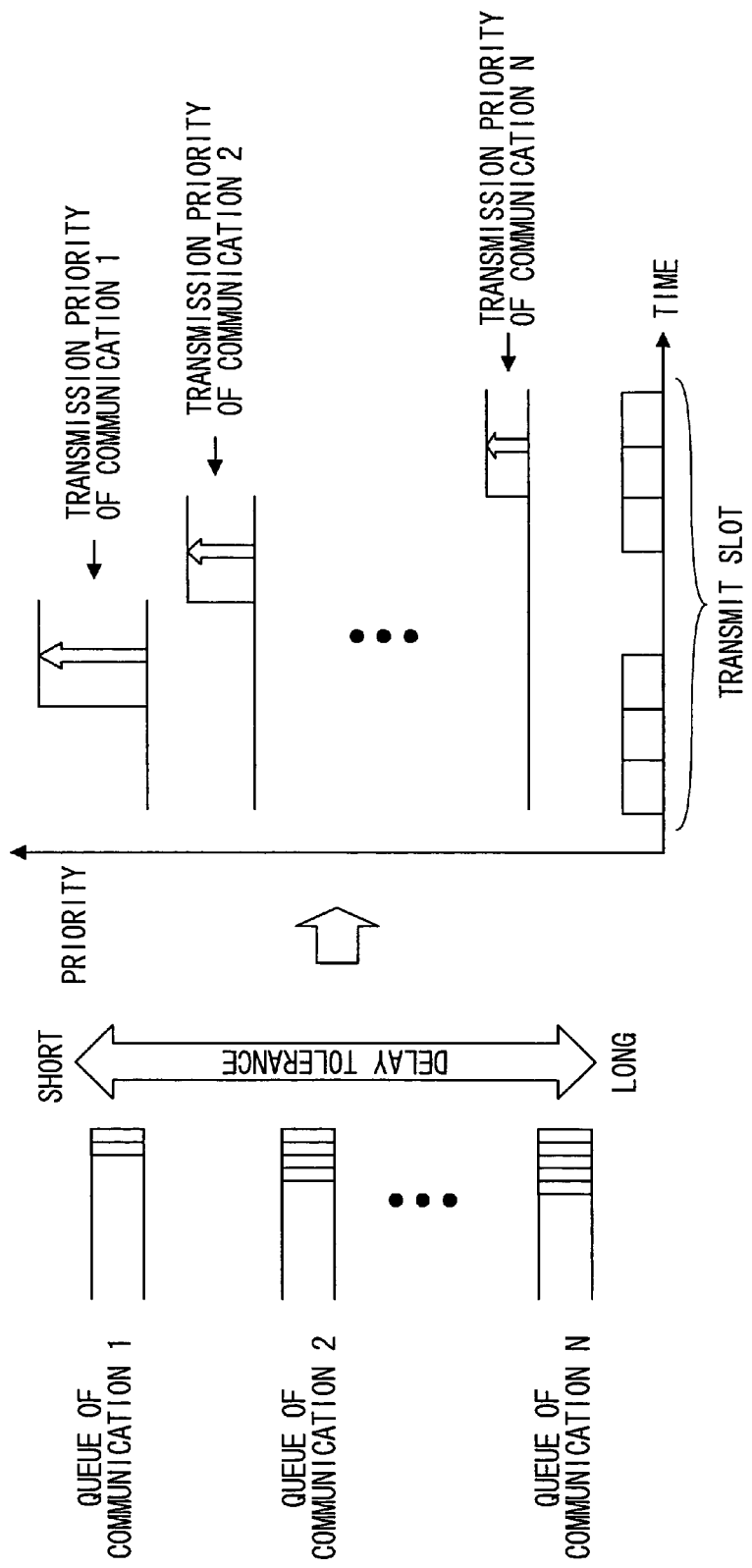
FIG. 13 is a diagram illustrating a case of controlling the priority value depending on the elapsed time period according to the Equation (8)

In the Expressions as described above, the letters represent the following:

t: the elapsed time period of the packet $T_{req}$: the delay tolerance of the packet $T_{pri}$: a predetermined constant a: a predetermined constant Next, as an example, a description is provided with reference to FIG. 13 for a case of controlling the priority value depending on the elapsed time period based on the Expression (8) as described above. In FIG. 13, it is assumed that the priority value of each communication (communication 1 through communication N) is preset depending on the delay tolerance. Moreover, it is assumed that, out of the queue of each communication, the queue of the communication 1 is a queue having a PDU with the shortest delay tolerance, and the delay tolerance for the PDU to be retransmitted becoming longer in the order of the communication 2 and then N.

In the present embodiment, incrementing the priority value depending on the elapsed time period is performed by setting the remaining time within the delay tolerance to fall below a predetermined time ($T_{pri}$). The incremental amount of the priority value herein may assume a different value depending on the delay tolerance. In the present embodiment, a transmitting priority is determined depending on the delay tolerance for communication 1, communication 2, . . . and communication N, the PDU to be retransmitted according to the determined transmission priority apportioned to a transmit slot for transmission.

Thus, according to the present embodiment, incrementing the transmission priority value based on an elapsed time period enables reducing packet loss.

(A Variation)

Figure 14:
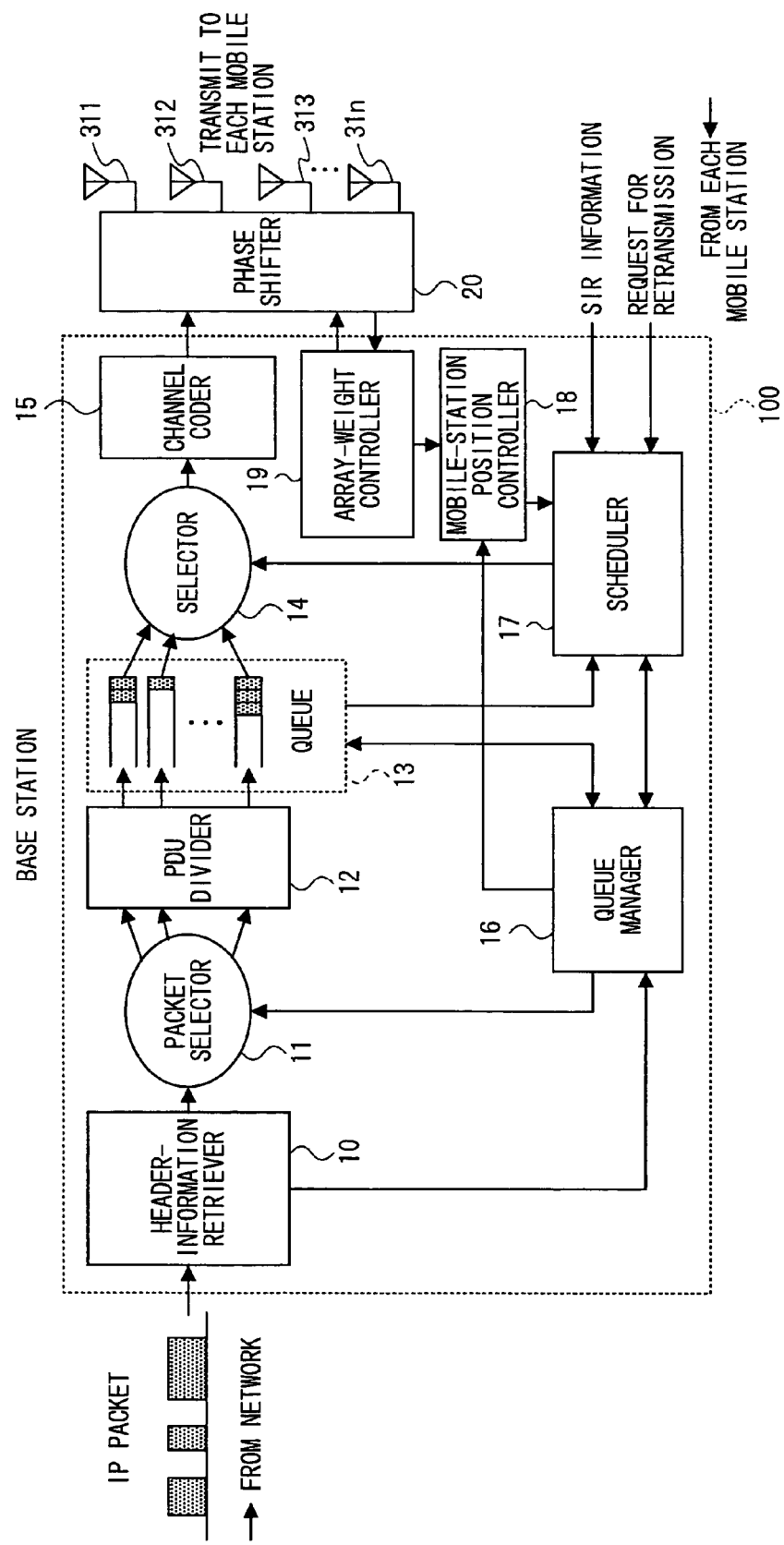
FIG. 14 is a block diagram for a case of applying an adaptive-array antenna to a base station according to the present invention.

While an embodiment of the present invention is described above, the embodiment as described above is strictly for illustration purposes only so that various changes may be made to the embodiment as described above to the extent of not departing from the scope of the present invention. For example, the following variation is possible:

(1) In the embodiment as described above, while an antenna having wide directivity covering a predetermined service area is envisioned, an adaptive-array antenna enabling an adaptive changing of the directivity may be applied as a transmitting antenna. In FIG. 14, a block diagram is illustrated for a case of applying an adaptive-array antenna to a base station 100. The base station 100 according to the present embodiment is set to have the same configuration as the base station illustrated in FIG. 1. Therefore, having provided letters of the same column (with the same end letters) for these elements, further description is omitted, the differences with the base station 100 illustrated in FIG. 1 are described in detail.

The base station 100 in the present embodiment is equipped with an adaptive-array antenna. This adaptive-array antenna consists of multiple antenna elements $31_1$, through $31_n$, a phase shifter 20, and an array-weight controller 19. The array-weight controller 19 generates a weight corresponding to the direction, etc., for each antenna element $31_1$, through $31_n$ for outputting to the phase shifter. The phase shifter 20 controls the amplitude and the phase of an excitation of each of the antenna elements $31_1$, through $31_n$. Hereby, having random directivity is enabled.

Next, a description is provided for an operation of the present embodiment in which an adaptive-array antenna is applied to the base station 100.

In FIG. 14, a scheduler 17 of a base station 100 retrieves position information of the destination mobile station of each mobile station from a mobile-station position controller 18, retrieves information on the directivity gain when the main beam is directed to each mobile station from the array-weight controller 19, and computes the number of other mobile stations enabled to transmit simultaneously with a destination mobile station of each communication so that, based on the outcome of the computation, the priority of each communication is incremented/decremented.

When the adaptive-array antenna is applied to the base station 100 as in the present embodiment, if a mobile station enabled to simultaneously transmit with a destination mobile station of a queue exists, the priority for the queue is incremented.

FIG. 15 is a diagram for describing a method of determining the number of other mobile stations enabled to transmit simultaneously with a mobile station of a destination of a packet by means of multiple simultaneous transmission using directive beams. FIG. 15(a) designates a condition making simultaneous transmission for multiple mobile stations possible while (b) in FIG. 15 designates a condition making the simultaneous transmissions for multiple mobile stations impossible.

First, the condition for making the simultaneous transmission possible designated in (a) in FIG. 15 is described.

With a directivity gain for a case where a beam is directed to a destination mobile station of a packet, out of other destination mobile stations existing in directions with the directivity gain falling below a predetermined threshold value, the mobile stations with the directivity gain not more than the predetermined threshold value are selected as the mobile stations enabled to simultaneously transmit from the base station 100.

In other words, in the present embodiment, the main beam is directed to the mobile stations (a mobile station A40, and a mobile station A41) (the beam pattern directed to the mobile station A40 indicated with a solid line and the beam pattern directed to the mobile station B41 indicated with a dotted line), a side lobe null (at or below the threshold value) of the mobile station A40 is directed to the mobile station B41, and a side lobe null (at or below the threshold value) of the mobile station B41 is directed to the mobile station B41. As a result, the mobile stations enabled to simultaneously transmit in the base station 100 are the mobile station A40 and the mobile station B41.

On the other hand, (b) in FIG. 15 illustrates a case of the simultaneous transmission not being possible such that, when the beam is directed to the mobile station existing in the direction with the directive gain at or below the threshold value, the main beam of the mobile station C42 and the main beam of the mobile station D43 overlap, making simultaneous transmission impossible.

It is to be noted that, by determining the number of mobile stations enabled to transmit simultaneously as described above at the mobile-station controller 18 of the base station 100, a queue is managed such that the larger the number of mobile stations enabled to transmit simultaneously with the destination mobile station, the larger the incremental amount of the priority value. Thus, adjusting the priority value makes data transmitted starting from a queue addressed to a mobile station enabled to transmit simultaneously with the queue having a priority placed, enabling an increase in the throughput of the overall system.

Moreover, when determining the priority for each queue, it is possible to take into account the elapsed time period from the time of a packet outgoing from the source as the origin of a PDU with transmission not completed. It is noted that, with respect to the elapsed time period as described above, a method of incrementing the priority depending on an increase in the elapsed time period is also possible.

Furthermore, a method of incrementing the priority value when the average outgoing rate from the queue falls below the required rate is also possible. Hereby, improving the outgoing rate is enabled as allocating transmission resources to the applicable queue is increased.

As described above, according to the present embodiment with the use of an adaptive-array antenna in the base station 100, increasing the throughput of the overall system is enabled, as simultaneous transmission to multiple mobile stations is actively performed.

The present application is based on Japanese Priority Patent Application No. 2003-312320 filed Sep. 4, 2003, with the Japanese Patent Office, the entire contents of which are hereby incorporated by reference.

What is claimed is:

1. An apparatus controlling a priority for each of one or more packets input, comprising:
   a packet-priority setting unit configured to set a priority level in correspondence to a hierarchy of priority levels for said one or more packets input, the hierarchy being defined in accordance with one or more predetermined time varying parameters, and to adjust priorities of the set priority level based upon at least one further parameter, other than said one or more predetermined time varying parameters, varying over time as result of the set priority; and
   a wireless-resource allocating unit configured to determine the packet for which a wireless resource is allocated in accordance with said adjusted priority, wherein said packet-priority setting unit further comprises,
   a classification unit configured to classify said one or more packets input, according to said one or more predetermined time varying parameters, into a group within a plurality of groups, each of the plurality of groups having a respectively different priority depending on the hierarchical level corresponding thereto; and
   a queue-forming unit configured to form a queue in accordance with an attribute of said group.

2. The apparatus as claimed in claim 1, wherein said queue-forming unit further comprises:
   a first queue-forming unit configured to form one queue for said group, having as said attribute at least one further parameter other than said predetermined time varying parameters; and
   a second queue-forming unit configured to form a queue per call for a further group having as said attribute parameters other than the one or more predetermined time varying parameters; and
   wherein said packet-priority setting unit further comprises:
   a queue-priority setting unit configured to set, a priority for said group taking into account said parameters other than the one or more predetermined time varying parameters, as a priority for said queue formed per call; and
   queue-priority control unit configured to control, for the priority for said queue formed per call, when determining the priority taking into account yet other parameters besides said at least one further parameter other than the one or more predetermined time varying parameters, the priority per call based on said yet other parameters.

3. The apparatus as claimed in claim 2, wherein said queue-priority unit controls the priority for said queue formed per call based on any one of said one or more predetermined time varying parameters.

4. The apparatus as claimed in claim 3, wherein said queue-priority control unit employs, when controlling the priority for said queue formed per call based on a reception state of a receiving station, reception-quality information such as a receiving CIR or a receiving SIR, or the required MCS measured at the receiving station, as information representing said reception state.

5. The apparatus as claimed in claim 4, wherein said queue-priority control unit controls, when controlling the priority for said queue formed per call based on said reception-quality information, said priority based on the value computed in accordance with:

$$-\begin{bmatrix} Q_{inst} & (Q_{inst} > Q_w) \\ Q_{inst}/Q_{avg} \bullet Q_w & (Q_{inst} \leq Q_w) \end{bmatrix} \quad (1)$$

with "$Q_{inst}$" representing the instantaneous reception quality of the receiving station at a receiving end, "$Q_{avg}$" representing the average reception quality of the receiving station at the receiving end, and "$Q_w$" being a predetermined constant.

6. The apparatus as claimed in claim 5, wherein the value of said "$Q_w$" is determined based on a delay tolerance of the packet.

7. The apparatus as claimed in claim 3, wherein said queue-priority control unit controls the priority for said queue formed per call based on an elapsed time period starting from an outgoing time at a source of a packet being held at a beginning of the queue.

8. The apparatus as claimed in claim 7, wherein said queue-priority control unit controls, when controlling the priority for said queue formed per call based on said elapsed time period, said priority based on the value computed in accordance with:

$$\begin{cases} 0 & (t < T_{req} - T_{Pri}) \\ a & (t \geq T_{req} - T_{Pri}) \end{cases} \text{; or} \qquad (2)$$

$$\begin{cases} a \bullet t / (T_{req} - T_{Pri}) & (t < T_{req} - T_{Pri}) \\ a & (t \geq T_{req} - T_{Pri}) \end{cases}, \qquad (3)$$

with "t" representing the elapsed time period of the packet, "$T_{req}$" representing the delay tolerance of the packet, "$T_{Pri}$" being a predetermined constant, and "a" being a predetermined constant.

9. The apparatus as claimed in claim 3, wherein said queue-priority control unit the priority for said queue formed per call based on an elapsed time period starting from the outgoing time of, out of one or more packets held in the queue, a packet having a largest elapsed time period starting from an outgoing time at a source of the packet.

10. The apparatus as claimed in claim 1,
wherein, when setting in the hierarchical level using said predetermined one or more time varying parameters, the priority for said packet input, out of said predetermined one or more time varying parameters, each of the parameters of the one or more time varying parameters is taken into account at a hierarchical level the higher that said element is taken into account, the higher the importance of the element.

11. The apparatus as claimed in claim 1, wherein, when setting in the hierarchical level of priority of said one or more packets input using said one or more predetermined time varying parameters the priority for said packet input, out of said predetermined time varying parameters, each of the elements is taken into account such that the difference in the priority is larger the higher the importance of the element.

12. The apparatus as claimed in claim 1, wherein said packet-priority unit takes into account, when setting the priority for said one or more packets input into the hierarchy, a delay tolerance of the packet.

13. The apparatus as claimed in claim 1, further comprising:
a priority-group control unit configured to control a priority of a packet belonging to a given group depending on the type of the groups formed by the classifying based on any one of said predetermined one or more time varying parameters.

14. A method of packet-priority control for controlling a priority for each of one or more packets input, comprising:
setting a priority level in correspondence to a hierarchy of priority levels for said one or more packets input, the hierarchy being defined in accordance with one or more predetermined time varying parameters;
adjusting priorities of the set priority based upon at least one further parameter, other than said one or more predetermined time varying parameters, varying over time as a result of the set priority; and
determining a packet for which a wireless resource is to be allocated in accordance with said adjusted priority, wherein said step of setting a priority level further comprises,
classifying said one or more packets input, according to said one or more predetermined time varying parameters, into a group within a plurality of groups, each of the plurality of groups having a respectively different priority depending on the hierarchical level corresponding thereto; and
forming a queue in accordance with an attribute of said group.

* * * * *